(12) United States Patent
Yanev et al.

(10) Patent No.: US 11,273,585 B2
(45) Date of Patent: Mar. 15, 2022

(54) PROCESS FOR PRODUCING LONGER FIBERS IN INJECTION MOLDED SOLID PARTS BY DISSOLVING OF GAS DURING PLASTICIZING

(71) Applicant: SABIC Global Technologies B.V., Bergen op Zoom (NL)

(72) Inventors: Angel Yanev, Maastricht (NL); Joseph Gerardus Maria Van Gisbergen, Bergen op Zoom (NL); Davy Wilhelmus Anna Brands, Maastricht (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 223 days.

(21) Appl. No.: 15/755,590

(22) PCT Filed: Aug. 30, 2016

(86) PCT No.: PCT/IB2016/055179
§ 371 (c)(1),
(2) Date: Feb. 27, 2018

(87) PCT Pub. No.: WO2017/037621
PCT Pub. Date: Mar. 9, 2017

(65) Prior Publication Data
US 2019/0022907 A1    Jan. 24, 2019

Related U.S. Application Data

(60) Provisional application No. 62/214,642, filed on Sep. 4, 2015.

(51) Int. Cl.
*B29C 45/18*       (2006.01)
*B29C 45/00*       (2006.01)
(Continued)

(52) U.S. Cl.
CPC ...... *B29C 45/1816* (2013.01); *B29C 45/0001* (2013.01); *B29C 45/0005* (2013.01);
(Continued)

(58) Field of Classification Search
CPC ............ B29C 2045/1875; B29C 45/18; B29C 45/005; B29C 2045/1722; B29C 44/60;
(Continued)

(56) References Cited

U.S. PATENT DOCUMENTS 3,229,352 A * 1/1966 Balkin ................... B29C 44/10
                                                492/59
5,773,042 A   6/1998 Amano et al.
(Continued)

FOREIGN PATENT DOCUMENTS

CN      1966242 A       5/2007
CN    101712789 A       5/2010
(Continued)

OTHER PUBLICATIONS

English translation of WO-2006136609 (Cramer) (Year: 2006).*
(Continued)

*Primary Examiner* — Jacob T Minskey
*Assistant Examiner* — Adrien J Bernard
(74) *Attorney, Agent, or Firm* — Cantor Colburn LLP

(57) ABSTRACT

The disclosure is directed to a solid part, and a device and process of making the solid part. The process includes introducing a glass fiber filled polymeric material to a hopper of an injection molding machine, where the glass fibers have a pre-molding length, melting the glass fiber filled polymeric material to form a melt in a plasticizing unit, pressurizing the plasticizing unit of the injection molding machine with a blowing agent, dissolving the blowing agent (Continued)

into the melt, injecting the melt into a mold cavity up to 100% of volume, and forming the solid part.

18 Claims, 6 Drawing Sheets

(51) Int. Cl.
| | |
|---|---|
| B29C 45/17 | (2006.01) |
| B29K 105/12 | (2006.01) |
| B29K 509/08 | (2006.01) |
| B29K 23/00 | (2006.01) |
| B29K 25/00 | (2006.01) |
| B29K 27/06 | (2006.01) |
| B29K 33/00 | (2006.01) |
| B29K 55/02 | (2006.01) |
| B29K 69/00 | (2006.01) |
| B29K 71/00 | (2006.01) |
| B29K 79/00 | (2006.01) |
| B29C 44/34 | (2006.01) |
| B29L 31/52 | (2006.01) |
| B29C 44/60 | (2006.01) |
| B29C 44/42 | (2006.01) |
| B29L 31/34 | (2006.01) |
| B29L 31/48 | (2006.01) |
| B29C 44/10 | (2006.01) |
| B29L 31/44 | (2006.01) |
| B29K 33/04 | (2006.01) |
| B29L 31/30 | (2006.01) |
| B29L 31/00 | (2006.01) |

(52) U.S. Cl.
CPC .............. *B29C 45/18* (2013.01); *B29C 44/10* (2013.01); *B29C 44/3446* (2013.01); *B29C 44/42* (2013.01); *B29C 44/422* (2013.01); *B29C 44/60* (2013.01); *B29C 2045/1702* (2013.01); *B29C 2045/1722* (2013.01); *B29K 2023/12* (2013.01); *B29K 2025/06* (2013.01); *B29K 2027/06* (2013.01); *B29K 2033/04* (2013.01); *B29K 2033/12* (2013.01); *B29K 2055/02* (2013.01); *B29K 2069/00* (2013.01); *B29K 2071/00* (2013.01); *B29K 2079/085* (2013.01); *B29K 2105/12* (2013.01); *B29K 2509/08* (2013.01); *B29L 2031/30* (2013.01); *B29L 2031/3481* (2013.01); *B29L 2031/44* (2013.01); *B29L 2031/4821* (2013.01); *B29L 2031/52* (2013.01); *B29L 2031/5209* (2013.01); *B29L 2031/776* (2013.01)

(58) Field of Classification Search
CPC ... B29C 44/42; B29C 44/422; B29C 44/3446; B29C 2045/1702; B29K 2509/08
See application file for complete search history.

(56) References Cited

U.S. PATENT DOCUMENTS

| | | | |
|---|---|---|---|
| 5,816,698 A | 10/1998 | Durina et al. | |
| 6,165,396 A | 12/2000 | Sato et al. | |
| 6,287,494 B1 * | 9/2001 | Clarke | B29C 44/3446 264/50 |
| 6,368,701 B1 | 4/2002 | Nomura et al. | |
| 6,623,838 B1 | 9/2003 | Nomura et al. | |
| 6,686,034 B1 | 2/2004 | Mizukami et al. | |
| 7,364,788 B2 | 4/2008 | Kishbaugh et al. | |
| 7,678,854 B2 | 3/2010 | Lee et al. | |
| 7,977,449 B2 | 7/2011 | Bradley | |
| 2007/0108663 A1 | 5/2007 | Yusa et al. | |
| 2009/0042011 A1 | 2/2009 | Jaarsma | |
| 2014/0061966 A1 | 3/2014 | Bandyopadhyay et al. | |
| 2014/0159283 A1 | 6/2014 | Lee et al. | |
| 2016/0237269 A1 | 8/2016 | Goda et al. | |

FOREIGN PATENT DOCUMENTS

| | | |
|---|---|---|
| CN | 103862623 A | 6/2014 |
| DE | 102005061053 A1 | 6/2007 |
| DE | 102009012481 B3 | 9/2010 |
| WO | WO 2002/026482 A1 | 4/2002 |
| WO | WO 2002/047893 A1 | 6/2002 |
| WO | WO 2006/136609 A1 | 12/2006 |

OTHER PUBLICATIONS

Becker et al.; "Gas-assisted injection molding of long glass Fiber Reinforced Thermoplastics"; Journal of Materials Processing & Manufacturing Science; vol. 6 Issue 1; Jul. 1997; 7 pages.
Zhang et al.; "Reduced fibre breakage in a glass-fibre reinforced thermoplastic through foaming"; Composites Science and Technology; vol. 65 Issue 14; Nov. 2005; p. 2240-2249.
Karen Laird; "Arburg presents innovative foaming solution at Technology Days 2015"; Plastics Today; https://www.plasticstoday.com/content/arburg-presents-innovative-foaming-solution-technology-days-2015/29415185621973; Mar. 2015; accessed Sep. 19, 2019; 7 pages.
Hopmann et al.; "Quo vadis Injection Moulding: State-of-the-Art of Science and Technology"; Polimeri; vol. 34; 2013; p. 47-53.
"NPE News in Injection Molding"; Plastics Technology; https://www.ptonline.com/articles/npe-news-in-injection-molding; Jun. 2009; accessed Sep. 19, 2019; 27 pages.
Khanh et al.; "The effects of injection molding on the mechanical behavior of long-fiber reinforced PBT/PET blends"; Composites Science and Technology; vol. 40; 1991; p. 423-435.
Inoue et al.; "Effect of screw design on fiber breakage and dispersion in injection-molded long glass-fiber-reinforced polypropylene"; Journal of Composite Materials; vol. 49; 2015; p. 75-84.
"Special screw for PP containing long glass fiber"; https://www.u-mhipt.co.jp/en/skill/seikei/screw/; Oct. 2019; 2 pages.
"Xaloy® Pulsar® II Mixing Injection Molding Screw"; http://www.xaloy.com/Product-Pulsar-II-Mixing-Screw; Nordon Corporation; © 2018; access Jul. 25, 2018; 2 pages.
Verlag et al.; "Special Foaming Injection Molding—Combined Feed of Granulate and Propellant"; Kunststoffe International; May 2015; p. 14-15.
"IKV prasentiert neues Verfahren auf Basis von Standardanlagen"; Industrie Anzeiger; Nov. 2012; 4 pages (no English Translation or Abstract)—this art was cited in the Search Report for PCT/IB2016/055179 dated Oct. 19, 2016.
"IKV: ProFoam vereinfacht das Schaumspritzgiefsen"; Zeitung; Jan. 2010; 2 pages (no English Translation or Abstract)—this art was cited in the Search Report for PCT/IB2016/055179 dated Oct. 19, 2016.
International Patent Application No. PCT/IB2016/055179; Int'l Written Opinion and the Search Report; dated Oct. 19, 2016; 15 pages.
International Patent Application No. PCT/IB2016/055179; Int'l Preliminary Report on Patentability; dated Mar. 15, 2018; 11 pages.

\* cited by examiner

PROCESS FOR PRODUCING LONGER FIBERS IN INJECTION MOLDED SOLID PARTS BY DISSOLVING OF GAS DURING PLASTICIZING

CROSS REFERENCE TO RELATED APPLICATIONS

This application is the National Stage of International Application No. PCT/IB2016/055179 filed Aug. 30, 2016, which claims the benefit of U.S. Provisional Application No. 62/214,642 filed Sep. 4, 2015, the disclosures of which are incorporated herein by this reference in their entireties.

BACKGROUND OF THE DISCLOSURE

1. Field of the Disclosure

This disclosure is directed to a process for producing solid parts utilizing modified foaming injection molding processes; particularly to a device and process for producing solid parts having longer fibers utilizing modified foaming injection molding processes; and more particularly to a solid part produced by a device and/or process utilizing modified foaming injection molding processes resulting in longer fibers.

2. Related Art

It is desirable for formed polymeric parts (e.g., automotive parts) to be lighter in weight without a reduction in mechanical or physical properties of the part. However, injection molding with long glass fiber filled materials typically results in substantial fiber breakage with intrinsic loss of mechanical properties such as strength, stiffness, and impact resistance. Foamed injection molding can provide a lighter weight part as compared to a part formed by other methods, but using foamed injection molding with long glass fiber filled materials typically results in substantial fiber breakage with intrinsic loss of mechanical properties such as strength, stiffness, and impact resistance as well.

More specifically, processing of the long glass filled materials is a complex process in which hardware and processing parameters are critical for minimizing the fiber breakage during plasticizing of the material. It is well known, that, if proper tool guidelines are used, the majority of the fiber breakage occurs during plasticizing in a barrel/screw. Fiber breakage usually can be reduced by either using very gentle plasticizing settings, which leads to longer cycle times or by utilization of special equipment such as special long fiber reinforced thermoplastics screws or pre-heating treatment. All of these measures decrease an operational window and increase overall part costs, thus decreasing long fiber reinforced thermoplastics competitiveness. Dissolving gas into a polymer melt is used to enable foaming of the product. In order to achieve this, good homogenization of the melt and gas is required, but current state of the art requires harsh mixing conditions to be used, resulting in greater fiber breakage.

Thus, there is a need in the art for a solid part, device for making a solid part, and a process for making a solid part made from a fiber filled material with limited breakage of the glass fibers in order to maximize mechanical performance.

SUMMARY OF THE DISCLOSURE

According to an aspect of the disclosure, a process of making a solid part in which a post-molding length of glass fibers in the solid part is greater than a post-molding length of glass fibers in a similarly dimensioned solid part made without pressurizing a plasticizing unit, the process includes introducing a glass fiber filled polymeric material to a hopper of an injection molding machine, where the glass fibers have a pre-molding length, melting the glass fiber filled polymeric material to form a melt in a plasticizing unit, pressurizing the plasticizing unit of the injection molding machine with a blowing agent, dissolving the blowing agent into the melt, injecting the melt into a mold cavity up to 100% of volume, and forming the solid part.

The process may further include applying a packing pressure to the mold cavity after injecting the melt into the mold cavity. The process may further include applying a packing pressure to the mold cavity after injecting the melt into the mold cavity to limit the dissolved blowing agent from expanding and limiting a formation of foam in the solid part. In one aspect, a post-molding length of the glass fibers in the solid part is greater than a post-molding length of glass fibers in a similarly dimensioned solid part made without use of a gas dissolving described. The blowing agent may be a gaseous blowing agent. The blowing agent may be at least one from nitrogen gas, oxygen gas, carbon dioxide gas, and a combination including at least one of the foregoing. The polymeric material may be at least one from polycarbonate, polypropylene, polyarylate, polyester, polyphenylene ether, polystyrene, acrylonitrile butadiene styrene, polyether, polyimide, polyetherimide, polysulfone, polyether ketone, polyether ether ketone, poly(methyl methacrylate), polyvinyl chloride, polysiloxane, and combinations including at least one of the foregoing.

According to another aspect of the disclosure, an injection molding device configured to produce a solid part includes a hopper configured to introduce a glass fiber filled polymeric material, where the glass fibers have a pre-molding length, a plasticizing unit configured to melt the glass fiber filled polymeric material to form a melt, a gas source configured to pressurize the plasticizing unit of the injection molding device with a blowing agent, and the plasticizing unit further configured to deliver the melt into a mold cavity up to 100% of volume to form the solid part.

The device may further include an airlock arranged between a barrel of the injection molding device and the hopper. The airlock may include a plurality of valves configured to control delivery of pellets and maintain a pressure within the plasticizing unit. The blowing agent may be a gaseous blowing agent. The plasticizing unit may be further configured such that a post-molding length of the glass fibers in the solid part is greater than post-molding length of glass fibers in a similarly dimensioned solid part made without a pressurized plasticizing unit and dissolvent of the gas. The blowing agent may be at least one from nitrogen gas, oxygen gas, carbon dioxide gas, and a combination including at least one of the foregoing. The polymeric material may be at least one from polycarbonate, polypropylene, polyarylate, polyester, polyphenylene ether, polystyrene, acrylonitrile butadiene styrene, polyether, polyimide, polyetherimide, polysulfone, polyether ketone, polyether ether ketone, poly(methyl methacrylate), polyvinyl chloride, polysiloxane, and combinations including at least one of the foregoing. The airlock may include a blowing agent input configured to receive the blowing agent and maintain a pressure within the plasticizing unit. The device may further include a controller configured to control at least one of the following: at least one heater, the gas source, the plasticizing unit, and the plurality of valves in any of the above aspects.

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate aspects of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

Figure 1:
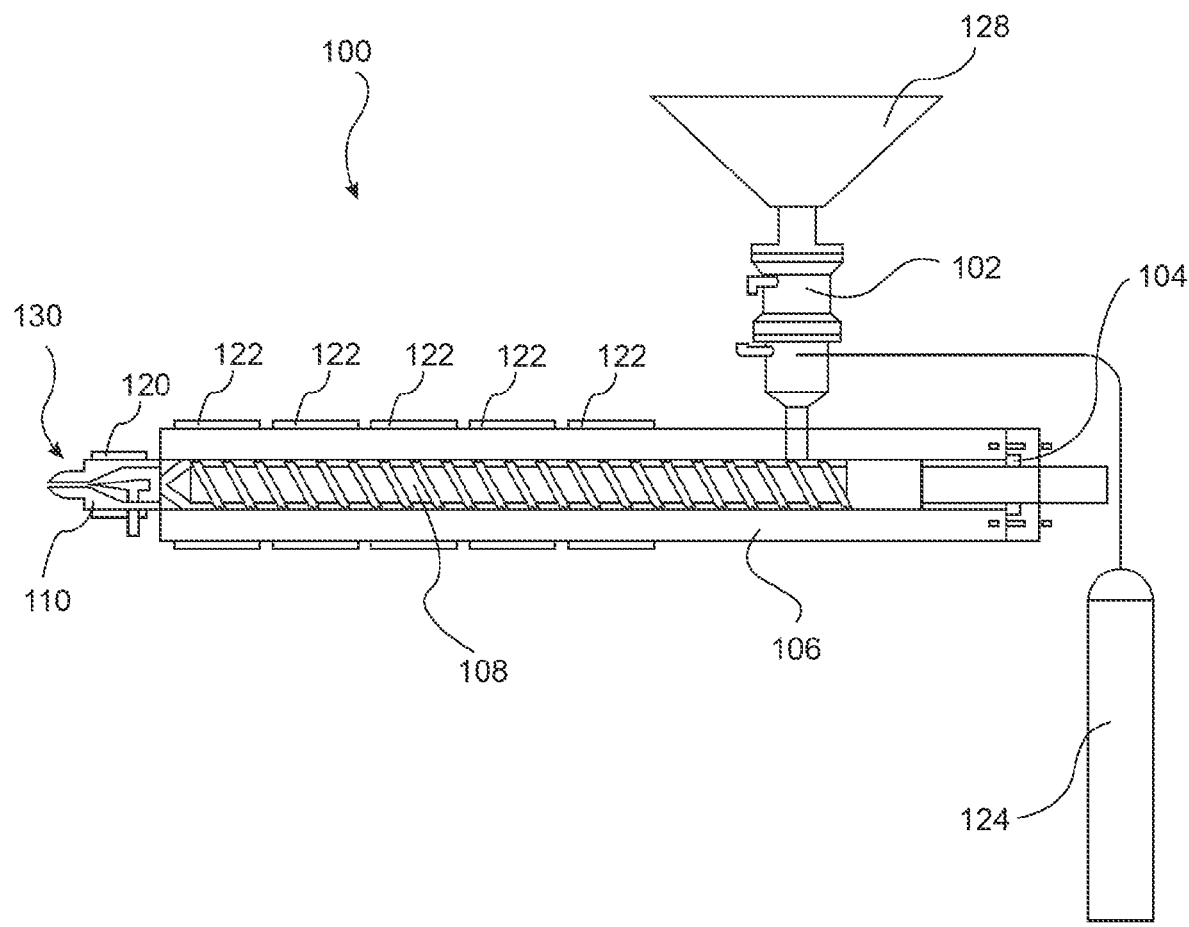
FIG. 1 shows an injection molding barrel/screw constructed according to the principles of the disclosure.

The aspects of the disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the disclosure. The examples used herein are intended merely to facilitate an understanding of ways in which the disclosure may be practiced and to further enable those of skill in the art to practice the aspects of the disclosure. Accordingly, the examples and aspects herein should not be construed as limiting the scope of the disclosure, which is defined solely by the appended claims and applicable law. Moreover, it is noted that like reference numerals represent similar parts throughout the several views of the drawings.

Disclosed herein are a device and process of making solid parts. The solid part can be made from a glass fiber filled polymeric material. The glass fibers can have an initial length before molding of the solid part and a final length after molding of the solid part. The final length of the glass fibers in the solid part is greater than a final length of glass fibers in prior art solid parts. Moreover, the process of the disclosure results in limited breakage of the glass fibers in the solid part. Accordingly, certain mechanical properties such as strength, stiffness, and impact resistance can be increased as compared to prior art solid parts.

The technology used to manufacture solid parts from glass fiber filled materials such that an average fiber length in the final part can be increased, can include placing an injection screw/barrel under pressure. The applied pressure may be relatively low compared to other foaming techniques since the gas does not need to be brought into a supercritical state. Such a manufacturing process can help ensure the glass fibers have less breakage during the forming process.

FIG. 1 shows an injection molding barrel/screw constructed according to the principles of the disclosure. As shown in FIG. 1, an injection molding barrel/screw 100 may include a hopper 128. Pellets of fiber reinforced thermoplastics are supplied by the hopper 128 to the injection molding barrel/screw 100 together with the gas (blowing agent) from a gas source 124. During plasticizing of the pellets in the injection molding barrel/screw 100, the gas may dissolve gradually in the melt. It should be noted that the term pellets is utilized throughout the specification only for brevity, other forms of fiber reinforced thermoplastics are contemplated as well. For example, other forms of fiber reinforced thermoplastics may include chopped strands, a mixture of plastic pellets and lose glass fibers, and the like.

The injection molding barrel/screw 100 may include a cylinder 106 maintaining a screw 108. The screw 108 may further include a motor or the like (not shown) for moving this screw 108. The injection molding barrel/screw 100 may further include a seal 104, an airlock 102 and a shutoff valve 110 configured to maintain gas pressure within the cylinder 106. Other constructions associated with the injection molding barrel/screw 100 are contemplated to maintain gas pressure within the cylinder 106.

Additionally, the injection molding barrel/screw 100 may include at least one heater 122. A nozzle 130 and/or an associated shutoff valve 110 may include at least one heater 120. The at least one heater 122 and the at least one heater 120 may be configured to maintain a temperature of the pellets and/or increase the temperature of the pellets to melt the same.

Figure 2:
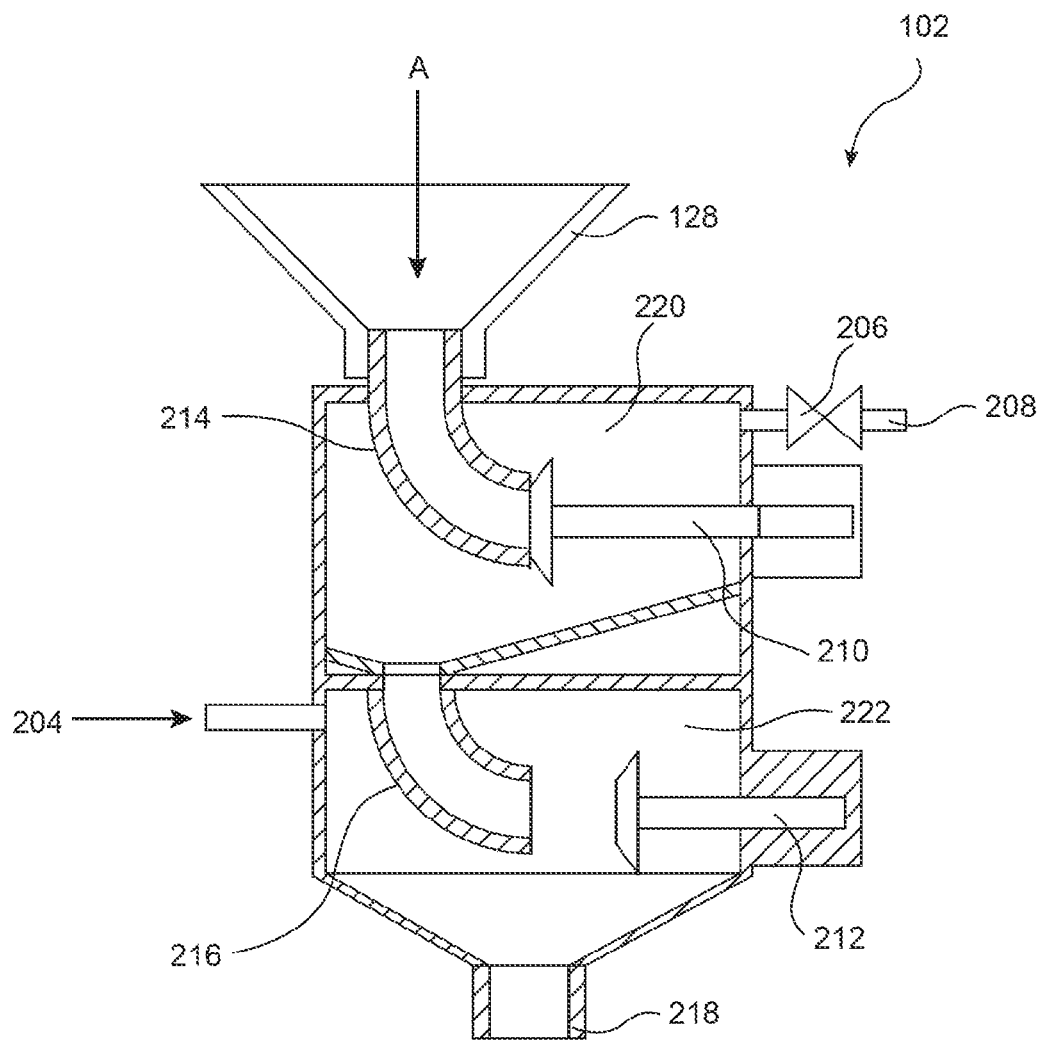
FIG. 2 shows a hopper and airlock constructed according to the principles of the disclosure.

FIG. 2 shows a hopper and airlock constructed according to the principles of the disclosure. In particular, the airlock 102 may include the hopper 128. The hopper 128 may additionally be configured separately from the airlock 102. Pellets from the hopper 128 may enter a conduit 214 within the airlock 102. Control of the movement of the pellets within the airlock 102 may be controlled by a first valve 210 (shown in the closed configuration). Opening of the first valve 210 towards the right will allow the pellets from the hopper 128 to enter an upper portion 220 of the airlock 102. Thereafter, the pellets travel to a conduit 216.

A second valve 212 (shown in the open position) controls movement of the pellets from the conduit 216 into a lower portion 222 of the airlock 102. In the lower portion 222, a blowing agent from the gas source 124 may be applied to an input 204 within the lower portion 222. The blowing agent may only be applied once the second valve 212 has been closed. The input 204 may include a valve (not shown) to control a flow of the blowing agent. Pellets in the lower portion 222 will travel through the connection 218 to the injection molding barrel/screw 100. It should be noted that the blowing agent may be injected at other locations as well.

The airlock 102 may further include a valve 206 that provides an outlet 208 for the blowing agent. The valve 206 may be opened to release the blowing agent through the outlet 208 after the second valve 212 is opened when the blowing agent has pressurized the lower portion 222. Actuation and operation of the first valve 210, the second valve 212, the valve 206, the blowing agent valve, the at least one heater 120, the at least one heater 122, the shutoff valve 110, the screw motor, and the like may be controlled by a controller as defined herein.

Figure 3:
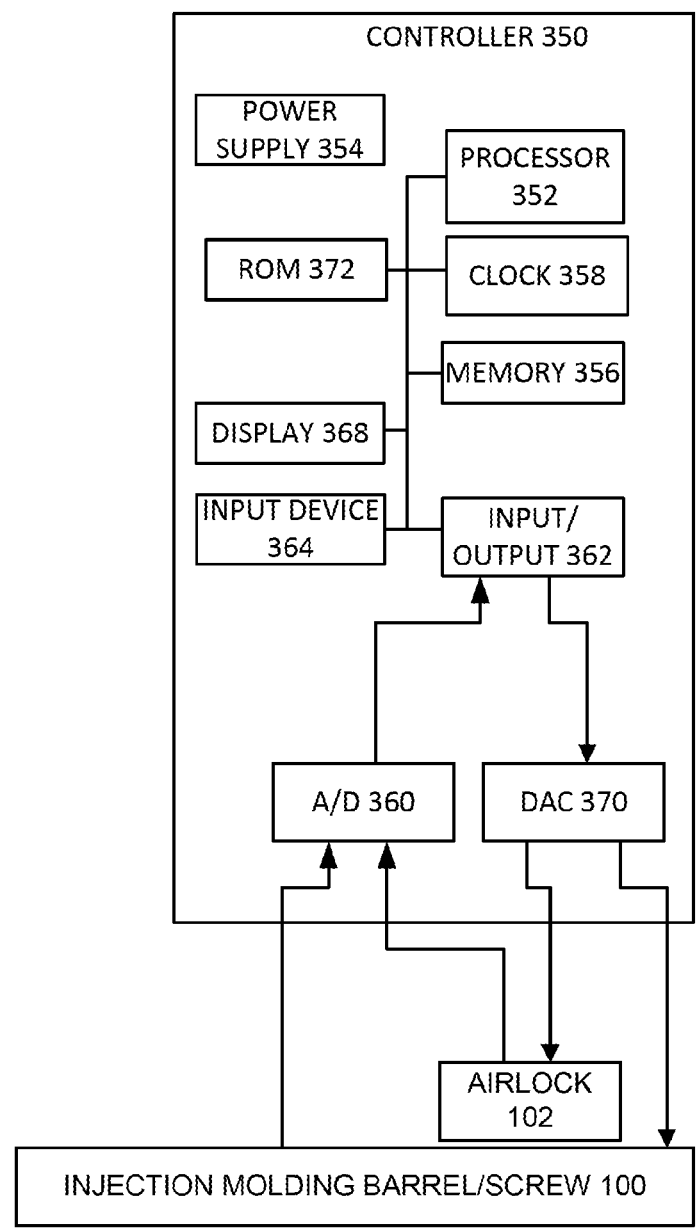
FIG. 3 shows a controller constructed according to the principles of the disclosure.

FIG. 3 shows a controller constructed according to the principles of the disclosure. The controller 350 may receive sensor outputs from a temperature sensor sensing temperature from any part of the injection molding barrel/screw 100 and associated system, a pressure sensor sensing pressure from a part of the injection molding barrel/screw 100 and associated system, a position sensor sensing position of a part of the injection molding barrel/screw 100 and associated system, and the like.

The controller 350 may include a processor 352. This processor 352 may be operably connected to a power supply 354, a memory 356, a clock 358, an analog to digital converter (A/D) 360, an input/output (I/O) port 362, and the like. The I/O port 362 may be configured to receive signals from any suitably attached electronic device and forward these signals from the A/D 360 and/or to processor 352. These signal includes signals from the temperature sensor sensing temperature from any part of the injection molding barrel/screw 100 and associated system, the pressure sensor sensing pressure from a part of the injection molding barrel/screw 100 and associated system, the position sensor sensing position of a part of the injection molding barrel/screw 100 and associated system, and the like. If the signals are in analog format, the signals may proceed via the A/D 360. In this regard, the A/D 360 may be configured to receive analog format signals and convert these signals into corresponding digital format signals.

The controller 350 may include a digital to analog converter (DAC) 370 may is configured to receive digital format signals from the processor, convert these signals to analog format, and forward the analog signals from the I/O port 362. In this manner, electronic devices configured to utilize analog signals may receive communications or be driven by the processor 352. The processor 352 may be configured to receive and transmit signals to and from the DAC 370, A/D 360 and/or the I/O port 362. The processor 352 may be further configured to receive time signals from the clock 358. In addition, the processor 352 is configured to store and retrieve electronic data to and from the memory 356. The controller 350 may further include a display 368, an input device 364, and a read-only memory (ROM) 372. Finally, the processor 352 may include a program stored in the memory 356 executed by the processor 352 to execute the process 300 described below.

Figure 4:
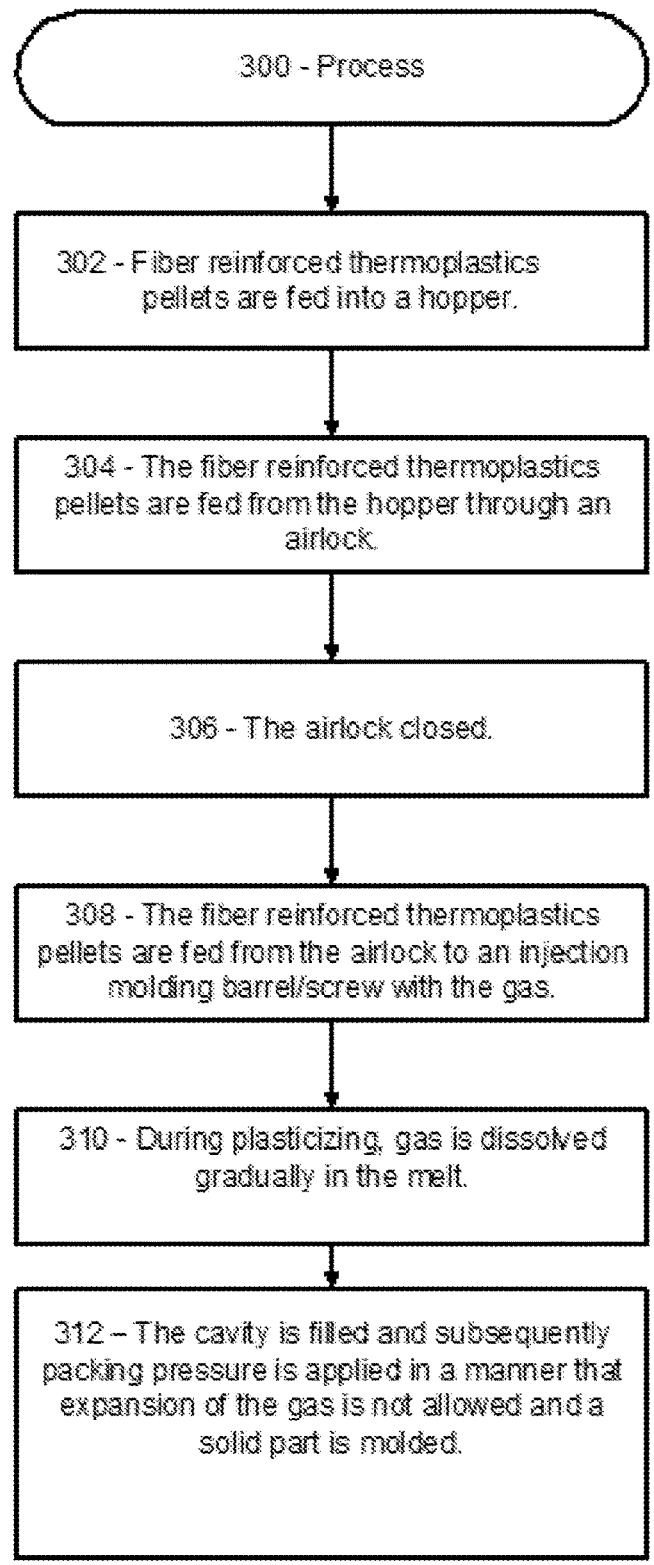
FIG. 4 shows a process of using a gas dissolving technique according to the principles of the disclosure.

FIG. 4 shows a process of using a gas dissolving technique according to the principles of the disclosure. In particular, FIG. 4 shows a process 300 according to the principles of the disclosure. In box 302, fiber reinforced thermoplastics pellets are fed into a hopper 128. Thereafter, in box 304, the fiber reinforced thermoplastics pellets are fed from the hopper 128 through an airlock 102. As shown in box 306, the airlock may be closed. This includes closing of one or more of the first valve 210 and the second valve 212.

As described in box 308, the fiber reinforced thermoplastics pellets are fed from the airlock 102 to the injection molding barrel/screw 100 together with the gas. As described in box 310, during plasticizing in the injection molding barrel/screw 100, the gas may dissolve gradually in the melt. As described in box 312, the cavity of a mold may be filled up to 100% of a volume and a packing pressure is applied. This may limit the dissolved gas from expanding the part, thus limiting the formation of foam. At least some of the gas may escape while the part is kept pressurized. Moreover, some of the gas may migrate out of the part after being extracted from the mold. The result is a part that contains solid fiber reinforced thermoplastics material but with longer fibers than normally would be achieved using the same settings and approach without pressurization and gas dissolvent. Additionally, the disclosed process may further benefit from having no and/or limited abrasive mixing elements in the injection molding barrel/screw 100 to further reduce fiber breakage.

In the process, the injection molding barrel/screw 100 (or other portion of a plasticizing unit of the injection molding machine) is pressurized with the gaseous blowing agent. To prevent the loss of blowing agent at the end of the screw, the seal 104 may be arranged between screw 108 and the cylinder 106. The injection molding barrel/screw 100 and/or plasticizing unit itself may be sealed with the airlock 102 that is mounted between the injection molding barrel/screw 100 and the hopper 128. The injection molding barrel/screw 100 and/or plasticizing unit may be equipped with a shutoff valve 110 and a position control for the screw 108 to keep the blowing-agent-loaded melt under pressure until it is injected into the mold. The injection molding barrel/screw 100 may be implemented as a 3-zone screw without any abrasive elements for dissolving the gas into the melt.

During trials it was discovered that by applying certain processing settings with dissolving gas into the melt, fiber length retention is better than with standard compact injection molding. Optimal conditions are achieved when increase of gas pressure is accompanied by the increase of the backpressure and a gap of 5 bar is left between two in favor of the backpressure. In another aspect, optimal conditions are achieved when increase of gas pressure is accompanied by the increase of the backpressure and a gap of at least 5 bar is left between two in favor of the backpressure. In another aspect, optimal conditions are achieved when increase of gas pressure is accompanied by the increase of the backpressure and a gap of 3 to 7 bar is left between two in favor of the backpressure. In another aspect, optimal conditions are achieved when increase of gas pressure is accompanied by the increase of the backpressure and a gap of 4 to 6 bar is left between two in favor of the backpressure. Pressure of the gas may be up to 35 bar for certain materials in certain applications. Further increase of the gas pressure has a negative impact on the fiber length for these certain materials and applications. Nevertheless, different pressures with different materials for different applications are contemplated as well. By using this process of dissolving gas into the melt and the processing parameters specified, parts with longer fibers compared to standard injection molded parts are produced.

Properties of fiber reinforced thermoplastics are to a large extent determined by the length of fibers. During injection molding of such fiber reinforced thermoplastics, breakage of these fibers occurs. It was discovered that by dissolving gas into the melt in the injection molding barrel/screw 100 fiber breakage could be reduced significantly. This was demonstrated by dissolving gas in the melt and eliminating the expansion step required for foaming to occur. Thus, compact parts can be molded, containing longer fibers, compared to conventionally injected parts. By having longer fibers in the molded parts, mechanical performance of the application can be improved and further weight reduction can be achieved. Long glass fiber materials have a relatively small processing window and with this technique the processing window can be broadened significantly.

Semi-structural parts including injection molded long fiber reinforced thermoplastics (LFRTP) typically display better stiffness, strength and impact behavior in comparison to short fiber reinforced materials. As such, these types of materials usually compete more towards high end applications than short fiber filled materials and can be sold at good pricing. For example the mechanical behavior of SABIC™ STAMAX™ PP-LGF (Polypropylene—Long Glass Fiber) competes to a typical Polyamide SGF (Short Glass Fibers) material. Key for material and application performance is in-part fiber length. The main challenge in converting LFRTP materials is to keep the long fibers, initially present in the pellets, as long as possible in the part during the plasticizing process. This requires a narrow processing window. The current disclosure widens the window of operation considerably and leads to longer fibers compared to optimal standard injection molding settings, thus improving part performance and LFRTP competitiveness.

Introducing gas into the injection molding barrel/screw 100 reduces the fiber breakage in the melt, such as in the injection molding barrel/screw 100. In particular, use of a foaming injection molded process may reduce friction in the process and produce solid injection molded parts with longer fibers. By use of the disclosed process, fiber retention in the injection molding barrel/screw 100 is improved, thus solid parts can be molded containing longer fibers, compared to conventionally injected parts.

EXAMPLES

Figure 5:
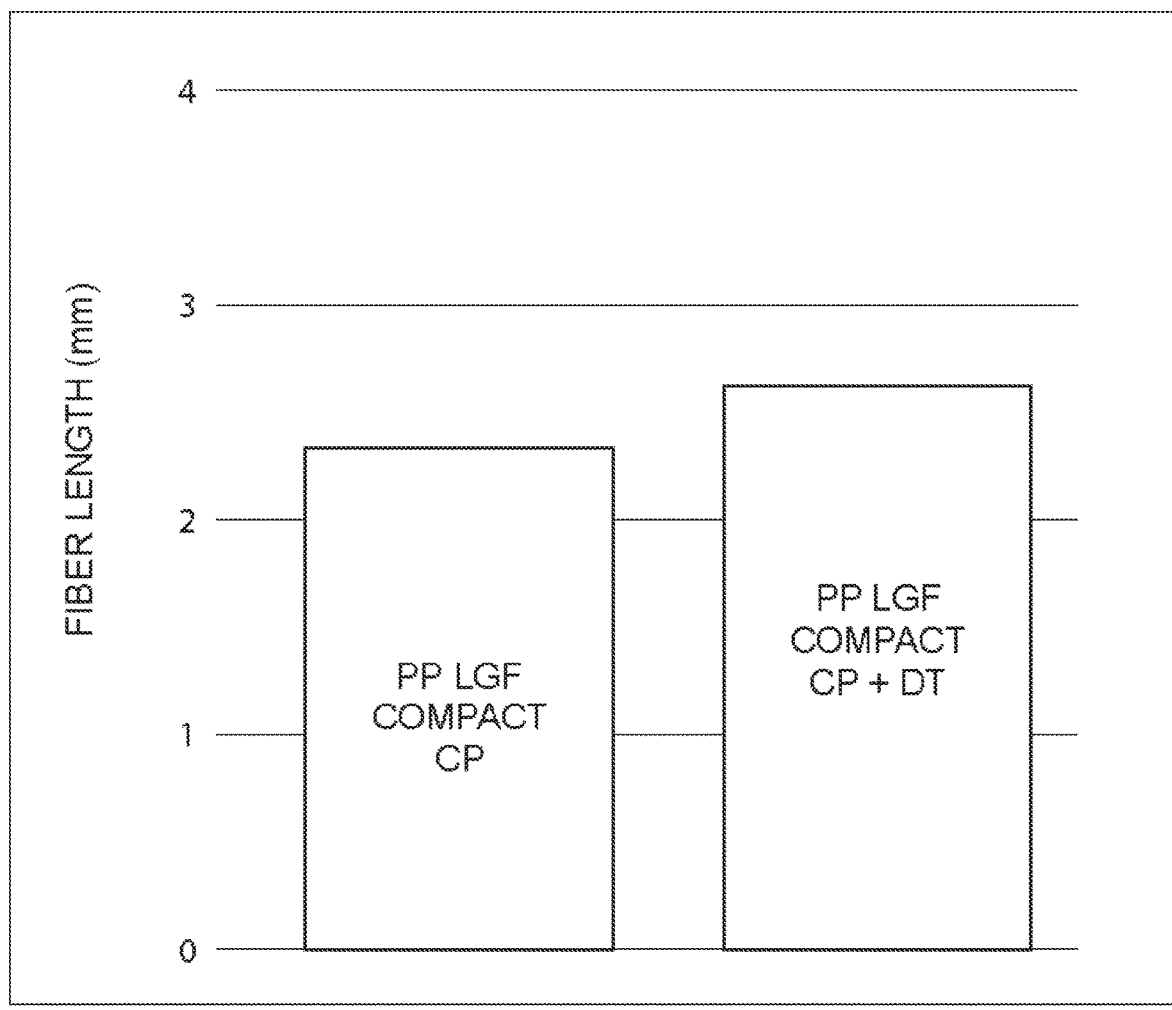
FIG. 5 shows test results of a length weighted average fiber length (Lw) in a middle of a plaque with and without use of the gas dissolving technique (DT) according to the principles of the disclosure for a copolymer (CP) sample.
Figure 6:
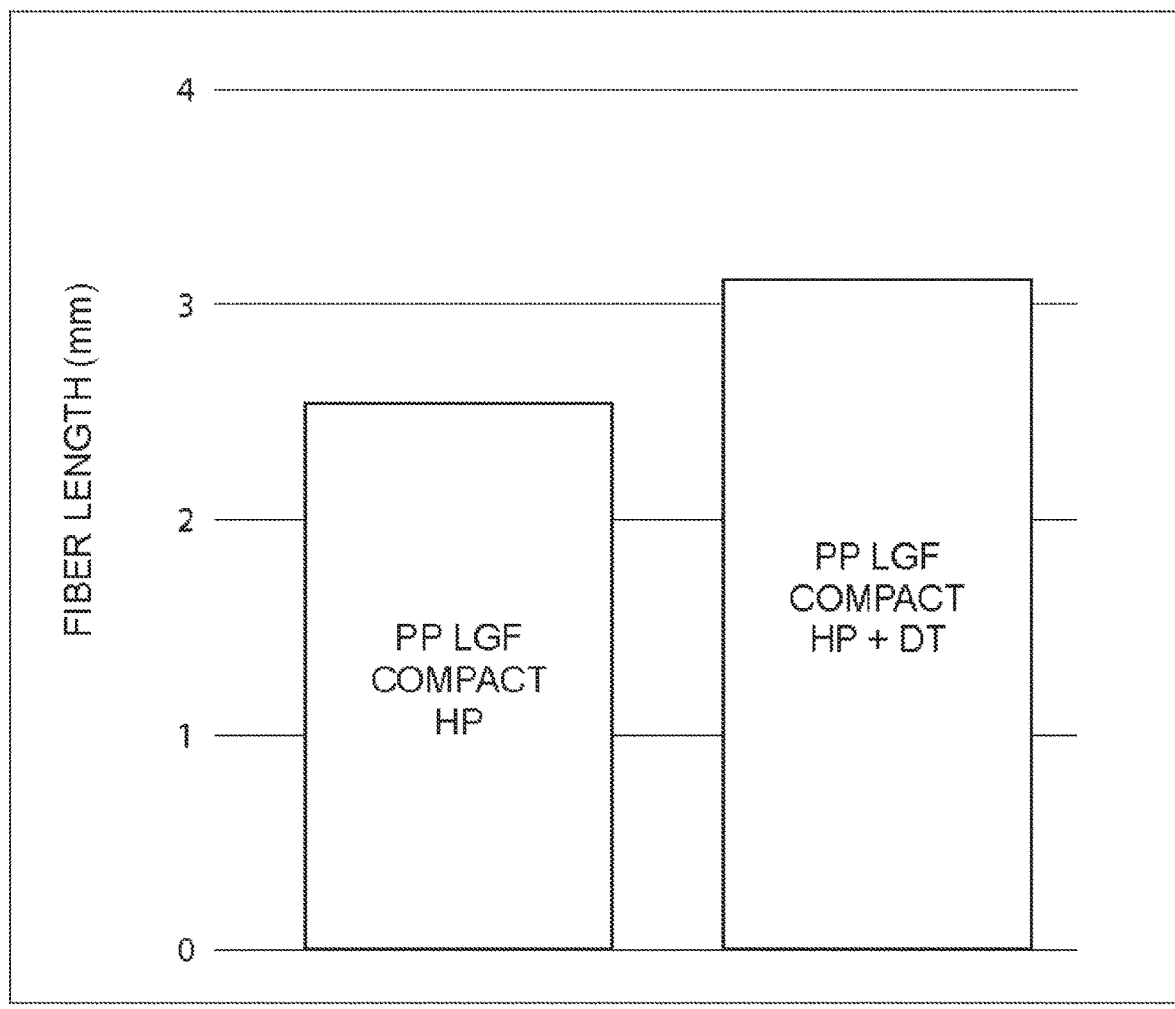
FIG. 6 shows test results of a length weighted average fiber length (Lw) in the middle of a plaque with and without use of the gas dissolving technique (DT) according to the principles of the disclosure for homopolymer (HP) samples.

FIG. 5 shows test results of a length weighted average fiber length (Lw) in a middle of a plaque with and without use of gas dissolving technique (DT) according to the principles of the disclosure for a copolymer (CP) sample; and FIG. 6 shows test results of a length weighted average fiber length (Lw) in the middle of a plaque with and without use of gas dissolving technique (DT) according to the principles of the disclosure for homopolymer (HP) samples. Measurements of the fiber length were performed for two reference grades of SABIC™ STAMAX™ PP-LGF (Polypropylene—Long Glass Fiber) with 30% glass content with initial length of the glass in the pellets of 12.5 mm. One of the grades is with homopolymer (STAMAX™ 30YM240 (SABIC™ STAMAX 30YM240 is a 30% long glass fiber reinforced polypropylene. The glass fibers are chemically coupled to the PP matrix, resulting in high stiffness and strength. Available from SABIC, and other was with copolymer (STAMAX™ 30YK270 (SABIC™ STAMAX 30YK270 is a 30% long glass fiber reinforced polypropylene with improved impact and flow properties. The glass fibers are chemically coupled to the PP matrix, resulting in high stiffness and strength. Available from SABIC. Plaques were produced by using the same processing conditions, only for samples produced by use of gas dissolving (+DT), gas was introduced in the injection unit with a certain pressure. The fiber lengths for compact parts produced in both ways, were measured in the middle of a plaque.

The results obtained for both, homopolymer and copolymer, reference grades of PP-LGF material with 30% glass content clearly show improved retention of fiber length by application of a gas dissolving technique. The improved retention of fiber length by use of the gas dissolving technique is in the range of 10-15%.

By using this technology, compact parts containing longer fibers can be produced. This is beneficial for the LFRTP materials, since fiber length is a determining factor for mechanical performance of the LFRTP applications. Another advantage of having better retention of fiber length with this process is to have a far wider processing window. The processing window for LFRTP materials is very narrow as the main issues are fiber retention and fiber dispersion, which contradict each other in processing. If enough shear is introduced into the processing, the dispersion is good, but fiber length is reduced and in contrary, if lower shear is applied the fiber retention is good, dispersion can be an issue. With this process, a larger processing window can be achieved resulting in good fiber dispersion in combination with relatively good fiber retention. Additionally, the process of the disclosure can be applied to other materials including Short Glass Fibers (SGF) materials and Direct Long Fiber Thermoplastic (DLFT) materials with similar benefits.

Based on the findings described above and shown in FIG. 5 and FIG. 6, the use of the disclosed gas dissolving process is beneficial for fiber retention within compact parts and gives a wider processing window achieving both, good fiber retention and fiber dispersion. This increases the opportunities for designing and processing lightweight applications with long glass fiber materials.

It is to be understood that any thermoplastic material can be processed using the methods disclosed herein. For example, the polymer can include polyphenylene ether-based resin, polyacetal-based resin, polyamide-based resin, polystyrene-based resin, polymethyl methacrylate based resin, polyacrylonitrile-based resin, polyester-based resin, polycarbonate, polyphenylene sulfide, polyetherimide, polyethersulfone, polysulfone, polyether (ether) ketone, polyolefin-based resin, polyethylene terephthalate based resin (PET), poly p phenylene based resin, polyvinyl chloride (PVC) based resin, polytetrafluoroethylene (PTFE) based resin and combinations including at least one of the foregoing.

Possible polymeric resins that may be employed include, but are not limited to, oligomers, polymers, ionomers, dendrimers, copolymers such as graft copolymers, block copolymers (e.g., star block copolymers, random copolymers, etc.) and combinations including at least one of the foregoing. Examples of such polymeric resins include, but are not limited to, polycarbonates (e.g., blends of polycarbonate (such as, polycarbonate-polybutadiene blends, copolyester polycarbonates)), polystyrenes (e.g., copolymers of polycarbonate and styrene, polyphenylene ether-polystyrene blends), polyimides (e.g., polyetherimides), acrylonitrile-styrene-butadiene (ABS), polyalkylmethacrylates (e.g., polymethylmethacrylates), polyesters (e.g., copolyesters, polythioesters), polyolefins (e.g., polypropylenes and polyethylenes, high density polyethylenes, low density polyethylenes, linear low density polyethylenes), polyamides (e.g., polyamideimides), polyarylates, polysulfones (e.g., polyarylsulfones, polysulfonamides), polyphenylene sulfides, polytetrafluoroethylenes, polyethers (e.g., polyether ketones, polyether etherketones, polyethersulfones), polyacrylics, polyacetals, polybenzoxazoles (e.g., polybenzothiazinophenothiazines, polybenzothiazoles), polyoxadiazoles, polypyrazinoquinoxalines, polypyromellitimides, polyquinoxalines, polybenzimidazoles, polyoxindoles, polyoxoisoindolines (e.g., polydioxoisoindolines), polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyls (e.g., polyvinyl ethers, polyvinyl thioethers, polyvinyl alcohols, polyvinyl ketones, polyvinyl halides, polyvinyl nitriles, polyvinyl esters, polyvinylchlorides), polysulfonates, polysulfides, polyureas, polyphosphazenes, polysilazzanes, polysiloxanes, and combinations including at least one of the foregoing.

More particularly, the polymeric can include, but is not limited to, polycarbonate resins (e.g., LEXAN™ resins, commercially available from SABIC such as LEXAN™ XHT, LEXAN™ HFD, etc.), polyphenylene ether-polystyrene blends (e.g., NORYL™ resins, commercially available from SABIC), polyetherimide resins (e.g., ULTEM™ resins, commercially available from SABIC), polybutylene terephthalate-polycarbonate blends (e.g., XENOY™ resins, commercially available from SABIC), copolyestercarbonate resins (e.g. LEXAN™ SLX or LEXAN™ FST resins, commercially available from SABIC), acrylonitrile butadiene styrene resins (e.g., CYCOLOY™ resins, commercially available from SABIC), polyetherimide/siloxane resins (e.g., SILTEM™, commercially available from SABIC), polypropylene resins, for example, long glass fiber filled polypropylene resins (e.g., STAMAX™ resins, commercially available from SABIC), and combinations including at least one of the foregoing resins. Even more particularly, the polymeric resins can include, but are not limited to, homopolymers and copolymers of a polycarbonate, a polyester, a polyacrylate, a polyamide, a polyetherimide, a polyphenylene ether, or a combination including at least one of the foregoing resins. The polycarbonate can include copolymers of polycarbonate (e.g., polycarbonate-polysiloxane, such as polycarbonate-polysiloxane block copolymer), linear polycarbonate, branched polycarbonate, end-capped polycarbonate (e.g., nitrile end-capped polycarbonate) blends of PC, such as PC/ABS blend, and combinations including at least one of the foregoing, for example a combination of branched and linear polycarbonate.

In one aspect, the polymeric material includes glass fibers. The glass fibers, as described herein, include glass fibers with an initial length of greater than or equal to 3 mm. However, in other aspects glass fibers with other initial lengths benefit from the process of the disclosure. The polymeric can include various additives ordinarily incorporated into polymer compositions of this type, with the proviso that the additive(s) are selected so as to not significantly adversely affect the desired properties of the part, in particular, mechanical properties, such as impact resistance. Such additives can be mixed at a suitable time during the mixing of the polymeric material for the part. Exemplary additives include impact modifiers, fillers, reinforcing agents, antioxidants, heat stabilizers, light stabilizers, ultraviolet (UV) light stabilizers, plasticizers, lubricants, mold release agents, antistatic agents, colorants (such as carbon black and organic dyes), surface effect additives, anti-ozonants, thermal stabilizers, anti-corrosion additives, flow promoters, pigments, dyes radiation stabilizers (e.g., infrared absorbing), flame retardants, and anti-drip agents. A combination of additives can be used, for example a combination of a heat stabilizer, mold release agent, and ultraviolet light stabilizer. In general, the additives are used in the amounts generally known to be effective. The total amount of additives (other than any impact modifier, filler, or reinforcing agent) is generally 0.001 wt % to 5 wt %, based on the total weight of the polymeric material composition.

The addition of the blowing agent can be achieved by adding a gas such as nitrogen, oxygen, or carbon dioxide within a defined pressure and temperature range to the polymer melt. Within this range the gas can be dissolved within the polymer melt during plasticizing. Further, the gas may become a supercritical fluid during this process (but does not have to). Various techniques can be used to add the gas to the melt, including adding the gas to the melt in the machine barrel (technique 1) and adding the gas to the melt in an adapted hot runner system.

Technique 1 involves metering a gas such as nitrogen into the polymer melt stream as it moves down the barrel. The gas is thoroughly mixed into the polymer creating a single phase solution of polymer and gas.

Articles produced according to the disclosure include, for example, computer and business machine housings, home appliances, trays, plates, handles, helmets, automotive parts such as instrument panels, cup holders, glove boxes, interior coverings and the like. In various further aspects, formed articles include, but are not limited to, food service items, medical devices, animal cages, electrical connectors, enclosures for electrical equipment, electric motor parts, power distribution equipment, communication equipment, computers and the like, including devices that have molded in snap fit connectors. In a further aspect, articles of the present disclosure include exterior body panels and parts for outdoor vehicles and devices including automobiles, protected graphics such as signs, outdoor enclosures such as telecommunication and electrical connection boxes, and construction applications such as roof sections, wall panels and glazing. Multilayer articles made of the disclosed polycarbonates particularly include articles which will be exposed to UV-light, whether natural or artificial, during their lifetimes, and most particularly outdoor articles; i.e., those intended for outdoor use. Suitable articles are exemplified by enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; facsimile machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated articles; and like applications.

In one aspect, the parts can include articles including the disclosed glass fiber filled polymeric materials. In a further aspect, the article including the disclosed glass fiber filled polymeric materials can be used in automotive applications. In a yet further aspect, the article includes the disclosed glass fiber filled polymeric materials can be selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards. In an even further aspect, the article including the disclosed glass fiber filled polymeric materials can be selected from mobile device exteriors, mobile device covers, enclosures for electrical and electronic assemblies, protective headgear, buffer edging for furniture and joinery panels, luggage and protective carrying cases, small kitchen appliances, and toys.

In one aspect, the parts can include electrical or electronic devices including the disclosed glass fiber filled polymeric materials. In a further aspect, the electrical or electronic device can be a cellphone, a MP3 player, a computer, a laptop, a camera, a video recorder, an electronic tablet, a pager, a hand receiver, a video game, a calculator, a wireless car entry device, an automotive part, a filter housing, a luggage cart, an office chair, a kitchen appliance, an electrical housing, an electrical connector, a lighting fixture, a light emitting diode, an electrical part, or a telecommunications part.

The methods disclosed herein can provide favorable results with respect to the use of glass fiber filled materials since the loss of mechanical properties due to fiber length is upheld or increased as compared to the original fiber length in other moldings. Furthermore, initial cost for adapting the injection unit is low as only the pressurizing unit is an additional component.

EXAMPLES

Example 1

A process of making a solid part wherein a post-molding length of the glass fibers in the solid part is greater than a post-molding length of glass fibers in a similarly dimensioned solid part made without pressurizing a plasticizing unit, comprising: introducing a glass fiber filled polymeric material to a hopper of an injection molding machine, wherein the glass fibers have a pre-molding length; melting the glass fiber filled polymeric material to form a melt in a plasticizing unit; pressurizing the plasticizing unit of the injection molding machine with a blowing agent; dissolving the blowing agent into the melt; injecting the melt into a mold cavity up to 100% of volume; and forming the solid part.

Example 2

The process of Example 1, further comprising applying a back pressure during plasticizing of at least 5 bar greater than the pressurizing pressure.

Example 3

The process of Example 1, further comprising applying a back pressure wherein the back pressure during plasticizing is 3 to 7 bar greater than the pressurizing pressure.

Example 4

The process of Example 1, further comprising applying a back pressure wherein the back pressure during plasticizing is 4 to 6 bar greater than the pressurizing pressure.

Example 5

The process of Example 1, wherein the pressure of the gas is less than 35 bar.

Example 6

The process of Example 1, wherein the pressure of the gas is less than 75 bar.

Example 7

The process of Example 1, further comprising applying a packing pressure to the mold cavity after injecting the melt into the mold cavity.

Example 8

The process of Example 1, further comprising applying a packing pressure to the mold cavity after injecting the melt into the mold cavity to limit a dissolved blowing agent from expanding and limiting a formation of foam in the solid part.

Example 9

The process of Example 1, further comprising controlling delivery of the glass fiber filled polymeric material through an airlock and maintaining a pressure within the plasticizing unit by selectively operating a plurality of valves arranged in the airlock.

Example 10

The process of Example 1, further comprising sealing the plasticizing unit with a seal and an airlock mounted between a barrel of the injection molding machine and the hopper, wherein the seal is located between a rotating part and a fixed part of the plasticizing unit.

Example 11

The process of Example 1, further comprising pressurizing the plasticizing unit with the blowing agent to dissolve the blowing agent into the melt, wherein the blowing agent is a gaseous blowing agent.

Example 12

The process of Example 11, wherein the blowing agent is at least one from nitrogen gas, oxygen gas, carbon dioxide gas, and a combination comprising at least one of the foregoing.

Example 13

The process of any one of Examples 1-12, wherein the polymeric material is at least one from polycarbonate, polypropylene, polyarylate, polyester, polyphenylene ether, polystyrene, acrylonitrile butadiene styrene, polyether, polyimide, polyetherimide, polysulfone, polyether ketone, polyether ether ketone, poly(methyl methacrylate), polyvinyl chloride, polysiloxane, and combinations comprising at least one of the foregoing.

Example 14

A polymeric part made by the process of any one of Examples 1 to 13.

Example 15

An injection molding device configured to produce a solid part, comprising: a hopper configured to introduce a glass fiber filled polymeric material, wherein the glass fibers have a pre-molding length; a plasticizing unit configured to melt the glass fiber filled polymeric material to form a melt; a gas source configured to pressurize the plasticizing unit of the injection molding device with a blowing agent; and the plasticizing unit further configured to deliver the melt into a mold cavity up to 100% of volume to form the solid part.

Example 16

The device of Example 15, wherein the back pressure is at least 5 bar greater than the pressurizing pressure.

Example 17

The device of Example 15, wherein the backpressure is 3 to 7 bar greater than the pressurizing pressure.

Example 18

The device of Example 15, wherein the back pressure is 4 to 6 bar greater than the pressurizing pressure.

Example 19

The device of Example 15, wherein the back pressure is less than 35 bar.

Example 20

The device of Example 19, wherein the back pressure is less than 75 bar.

Example 21

The device of Example 15, further comprising a seal configured to seal the plasticizing unit, wherein the seal is arranged between a rotating part and a fixed part of the plasticizing unit; and an airlock arranged between a barrel of the injection molding device and the hopper.

Example 22

The device of Example 21, wherein the airlock comprises a plurality of valves configured to control delivery of the glass fiber filled polymeric material and maintain a pressure within the plasticizing unit.

Example 23

The device of Example 21, wherein the gas source is further configured to apply constant gas pressure into the barrel.

Example 24

The device of Example 15, wherein a packing pressure is applied to the mold cavity after injecting the melt into the mold cavity to limit a dissolved gas from expanding and limiting a formation of foam in the solid part.

Example 25

The device of Example 15, wherein the gas source is further configured to pressurize the plasticizing unit with the blowing agent to dissolve the blowing agent into the melt; and wherein the blowing agent is a gaseous blowing agent.

Example 26

The device of Example 15, wherein the plasticizing unit is further configured to operate in conjunction with a gas dissolvent such that a post-molding length of the glass fibers in the solid part is greater than a post-molding length of glass fibers in a similarly dimensioned solid part made without a pressurized plasticizing unit and without the gas dissolvent.

Example 27

The device of Example 15, wherein the blowing agent is at least one from nitrogen gas, oxygen gas, carbon dioxide gas, and a combination comprising at least one of the foregoing.

Example 28

The device of any one of Examples 15-27, wherein the polymeric material is at least one from polycarbonate, polypropylene, polyarylate, polyester, polyphenylene ether, polystyrene, acrylonitrile butadiene styrene, polyether, polyimide, polyetherimide, polysulfone, polyether ketone, polyether ether ketone, poly(methyl methacrylate), polyvinyl chloride, polysiloxane, and combinations comprising at least one of the foregoing.

Example 29

The device of Example 21, wherein the airlock comprises a blowing agent input configured to receive the blowing agent and maintain a pressure within the plasticizing unit.

Example 30

The device of any one of Examples 15 to 29, further comprising a controller configured to control at least one of the following: at least one heater, the gas source, the plasticizing unit, and the plurality of valves.

Further in accordance with various aspects of the disclosure, the methods described herein are intended for operation with a controller including, but not limited to, PCs, PDAs, semiconductors, application specific integrated circuits (ASIC), programmable logic arrays, cloud computing devices, and other hardware devices constructed to implement the methods described herein.

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure.

What is claimed is:

1. A process of making a solid part, comprising:
introducing a long glass fiber filled polymeric material to a hopper of an injection molding machine, wherein the glass fibers have a pre-molding length;
controlling delivery of the long glass fiber filled polymeric material through an airlock and maintaining a pressure within the plasticizing unit by selectively operating a plurality of valves arranged in the airlock;
sealing the plasticizing unit with a seal and the airlock mounted between a barrel of the injection molding machine and the hopper, wherein the seal is located between a screw and a cylinder of the plasticizing unit to prevent the loss of blowing agent at the end of the screw;
melting the glass fiber filled polymeric material to form a melt in a plasticizing unit;
pressurizing the plasticizing unit of the injection molding machine with a blowing agent, and applying a back pressure during plasticizing of at least 5 bar greater than the pressurizing pressure and below the critical point of the blowing agent;
dissolving the gaseous blowing agent into the melt during plasticizing;
injecting the melt into a mold cavity up to 100% of volume; and
forming the solid part by applying a packing pressure to the mold cavity after injecting the melt into the mold cavity and allowing gas to escape, the packing pressure selected to maintain the blowing agent below its critical point, wherein a post-molding length of the glass fibers in the solid part is greater than a post-molding length of glass fibers in a similarly dimensioned solid part made without pressurizing a plasticizing unit, without making the blowing agent supercritical, and without dissolving the gaseous blowing agent into the melt resulting in greater fiber breakage due to harsh mixing conditions.

2. The process of claim 1, wherein the packing pressure is selected to limit a dissolved blowing agent from expanding and limiting a formation of foam in the solid part.

3. The process of claim 1, wherein the blowing agent is at least one from nitrogen gas, oxygen gas, carbon dioxide gas, and a combination comprising at least one of the foregoing.

4. The process of claim 1, wherein the polymeric material is at least one from polycarbonate, polypropylene, polyarylate, polyester, polyphenylene ether, polystyrene, acrylonitrile butadiene styrene, polyether, polyimide, polyetherimide, polysulfone, polyether ketone, polyether ether ketone, poly(methyl methacrylate), polyvinyl chloride, polysiloxane, and combinations comprising at least one of the foregoing.

5. A polymeric part made by the process 1 comprising:
introducing a long glass fiber filled polymeric material to a hopper of an injection molding machine, wherein the glass fibers have a pre-molding length;
controlling delivery of the long glass fiber filled polymeric material through an airlock and maintaining a pressure within the plasticizing unit by selectively operating a plurality of valves arranged in the airlock;
sealing the plasticizing unit with a seal and the airlock mounted between a barrel of the injection molding machine and the hopper, wherein the seal is located between a screw and a cylinder of the plasticizing unit to prevent the loss of blowing agent at the end of the screw;
melting the glass fiber filled polymeric material to form a melt in a plasticizing unit;
pressurizing the plasticizing unit of the injection molding machine with a blowing agent, and applying a back pressure during plasticizing of at least 5 bar greater than the pressurizing pressure and below the critical point of the blowing agent;
dissolving the gaseous blowing agent into the melt during plasticizing;
injecting the melt into a mold cavity up to 100% of volume; and
forming the solid part by applying a packing pressure to the mold cavity after injecting the melt into the mold cavity and allowing gas to escape, wherein a post-molding length of the glass fibers in the solid part is greater than a post-molding length of glass fibers in a similarly dimensioned solid part made without pressurizing a plasticizing unit, without making the blowing agent supercritical, and without dissolving the gaseous blowing agent into the melt resulting in greater fiber breakage due to harsh mixing conditions.

6. An injection molding device configured to produce a solid part, comprising:
a hopper configured to introduce a long glass fiber filled polymeric material, wherein the glass fibers have a pre-molding length;
a plasticizing unit configured to melt the glass fiber filled polymeric material to form a melt;
an airlock arranged between a barrel of the injection molding device and the hopper, wherein the airlock comprises a plurality of valves configured to control delivery of the long glass fiber filled polymeric material and maintain a pressure within the plasticizing unit;
a seal configured to seal the plasticizing unit, wherein the seal is arranged between a screw and a cylinder of the plasticizing unit;
a gas source configured to pressurize the plasticizing unit of the injection molding device with a gaseous blowing agent to dissolve the blowing agent into the melt and to maintain the gaseous blowing agent below its critical point; and
the plasticizing unit further configured to deliver the melt into a mold cavity up to 100% of volume to form the solid part, wherein the mold cavity is configured to apply packing pressure while allowing gas to escape;
wherein the plasticizing unit is further configured to operate in conjunction with a gas dissolvent such that a post-molding length of the glass fibers in the solid part is greater than a post-molding length of glass fibers in a similarly dimensioned solid part made without a pressurized plasticizing unit and without the gas dissolvent resulting in greater fiber breakage due to harsh mixing conditions, and
wherein the plasticizing unit is further configured for application of a back pressure during plasticizing of at least 5 bar greater than a pressurizing pressure.

7. The device of claim 6, wherein the gas source is further configured to apply constant gas pressure into the barrel.

8. The device of claim 6, wherein a packing pressure is applied to the mold cavity after injecting the melt into the mold cavity to limit a dissolved gas from expanding and limiting a formation of foam in the solid part.

9. The device of claim 6, wherein the gas source is configured to pressurize the plasticizing unit of the injection molding device with a blowing agent comprising at least one of nitrogen gas, oxygen gas, carbon dioxide gas, and a combination comprising at least one of the foregoing.

10. The device of claim 6, wherein the plasticizing unit is configured to melt a glass fiber filled polymeric material selected from a group including polycarbonate, polypropylene, polyarylate, polyester, polyphenylene ether, polystyrene, acrylonitrile butadiene styrene, polyether, polyimide, polyetherimide, polysulfone, polyether ketone, polyether ether ketone, poly(methyl methacrylate), polyvinyl chloride, polysiloxane, and combinations comprising at least one of the foregoing.

11. The device of claim 6, wherein the airlock comprises a blowing agent input configured to receive the blowing agent and maintain a pressure within the plasticizing unit.

12. The device of claim 6, further comprising a controller configured to control at least one of the following: at least one heater, the gas source, the plasticizing unit, and the plurality of valves.

13. The product of claim 5, made by the process also comprising selecting the packing pressure to limit a dissolved blowing agent from expanding and limiting a formation of foam in the solid part.

14. The product of claim 5, wherein the polymeric part is formed of at least one of polycarbonate, polypropylene, polyarylate, polyester, polyphenylene ether, polystyrene, acrylonitrile butadiene styrene, polyether, polyimide, polyetherimide, polysulfone, polyether ketone, polyether ether ketone, poly(methyl methacrylate), polyvinyl chloride, polysiloxane, and combinations comprising at least one of the foregoing.

15. The product of claim 5, made by the process also comprising applying constant gas pressure into the barrel.

16. The product of claim 5, wherein dissolving the gaseous blowing agent includes dissolving at least one of nitrogen gas, oxygen gas, carbon dioxide gas, and a combination comprising at least one of the foregoing.

17. The device of claim 5, made by the process also comprising maintaining a pressure within the plasticizing unit by receiving the blowing agent in the airlock and maintain the pressure with the airlock.

18. The device of claim 5, made by the process also comprising controlling at least one heater, the gas source, the plasticizing unit, and the plurality of valves with a controller.

* * * * *